Patented Feb. 27, 1940

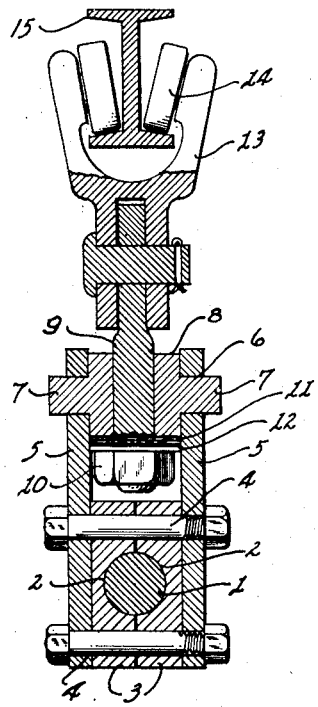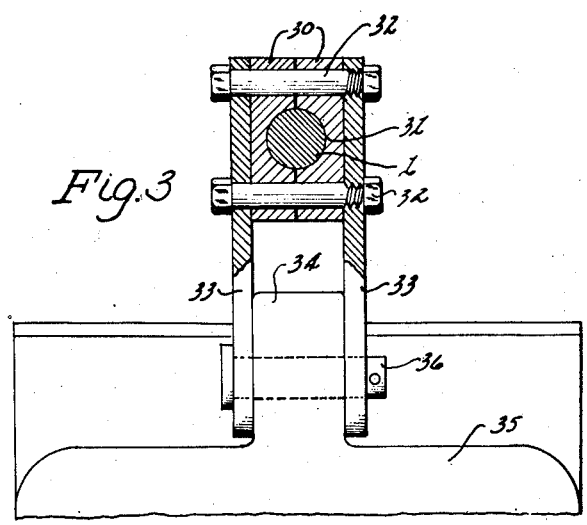

2,191,912

UNITED STATES PATENT OFFICE 2,191,912

PORTABLE WELDER SUPPORT

Albert D. Jardine and Harry V. Beronius, Detroit, Mich.

Application March 5, 1937, Serial No. 129,149

4 Claims. (Cl. 219—4)

The present invention relates to welding apparatus and more particularly to a portable type spot welding machine.

Electric welding machines comprise two essential parts of apparatus, one being the mechanism for supporting the electrodes and for forcing the electrodes into clamping engagement with the parts of the work to be welded and the other comprising a transformer for changing the electric current to a low voltage and high amperage. A practical type of mechanism for supporting the electrodes so as to provide a clamping action, which is well known in the art and available upon the market, comprises a stationary electrode which functions as an anvil and a movable electrode supported to be moved by a piston in the fluid pressure chamber. The parts of the work to be welded together are placed between the stationary electrode and the movable electrode and air under pressure is admitted to the pressure chamber to move the piston so that the work parts are tightly clamped between the two electrodes and at the time the work parts are brought into clamped engagement the current is passed through the work so that the resistance set up to the flow of current by the work generates sufficient heat to weld the parts together. Obviously the apparatus for performing this function must be of a sturdy construction and in order to provide it with sufficient mechanical strength it must be quite heavy. Its weight makes it difficult for an operator to carry the apparatus from place to place in order to consecutively weld a piece of work at different points throughout its length, particularly when the work is a matter of several feet in length, such movement being made even more difficult because it is necessary for the operator to drag the comparatively heavy supply cables along with the apparatus as it is moved from place to place.

The present invention has as its primary object to provide a welding apparatus of the general type referred to above which may be easily moved from place to place without requiring an excessive effort on the part of the operator. To accomplish this object the invention provides a balance beam construction wherein the welding apparatus is supported on one end thereof and the transformer is mounted on the other end and on the opposite side of the beam pivot to counterbalance the weight of the welding apparatus. This arrangement of the two essential parts of the apparatus provides for flexibility in the movements thereof and permits the electric welding apparatus to be moved from place to place along the work with very little effort. Preferably the welding apparatus is supported with respect to its end of the beam by a compensating type pulley so that it may be moved vertically with very little effort and the beam is supported by a mechanism permitting it to swivel around the axes located in both horizontal and vertical planes.

With the above and other ends in view the invention is more fully disclosed with reference to the accompanying drawings in which Figure 1 is an elevation;

Fig. 2 is a section taken on the line 2—2 of Fig. 1, and

Fig. 3 is a section taken on the line 3—3 of Fig. 1.

Like characters of reference are employed throughout to designate corresponding parts.

Figure 1:
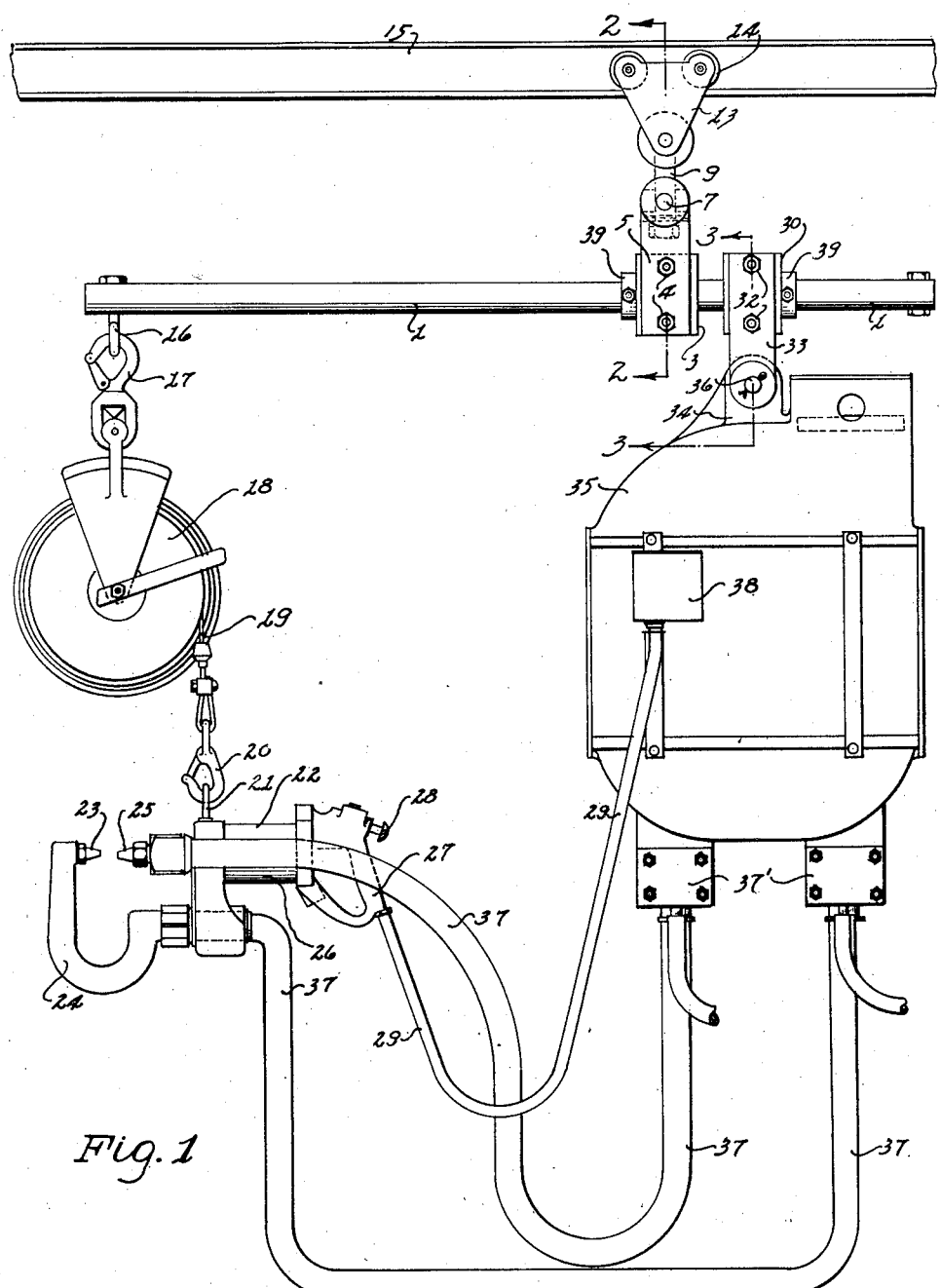

In the drawings the numeral 1 designates a beam which extends through complemental recesses 2 in a pair of blocks 3 which are tied together by bolts 4. Secured to the blocks 3 by means of the bolts 4 are a pair of links 5 having bearings 6 adjacent to their upper ends receiving spindles 7 on a body 8. Extending through the body 8 is a rod 9 which is free to rotate with respect to the body 8. The rod 9 is retained with respect to the body 8 by a nut 10 and anti-friction bearings 11 are interposed between a washer 12 supported by the nut and the bottom of the body 8. The upper end of the rod 9 is pivotally attached to a bracket 13 having rollers 14 received on an overhead conveyor track 15.

The beam 1 is supported by the elements above described so that its ends project outwardly from opposite sides of the blocks 3. On one of the projecting ends of the beam 1 is provided a loop 16 which receives a removable hook 17 supporting a pulley 18. The pulley 18 is of a type commercially known as a compensating pulley and such pulleys generally include a spiral spring mechanism which compensates for the weight of an article suspended by the cable 19 which is wound around the periphery of the pulley. For example, if the compensating spring is set to compensate for a weight of fifty pounds and a weight of fifty pounds is placed upon the end of the cable 19, the cable will not unwind from the pulley unless the weight is effected by an external pressure and if manual pressure were applied to the weight to unwind the cable 19 part-way when such pressure were removed the weight would remain at the position it was in when the pressure was removed. Inasmuch as compensating pulleys are well known in the art and available upon the market the details of construction of the pulley 18 have not been illustrated in detail here.

On the end of the cable 19 is provided a snap hook device 20 which engages a support 21 on a spot welding apparatus generally designated 22. This welding apparatus comprises a stationary electrode 23 supported by a bracket 24 and a movable electrode 25. Although it is not shown in detail it will be understood that the cylindrical part 26 comprises an air chamber and a piston is provided therein which is adapted to be moved by air pressure for the purpose of moving the electrode 25 when pieces of work are placed between the same and the stationary electrode 23. Attached to the cylinder 26 is a handle 27 and a valve control member 28 adapted to control the admittance of air under pressure from a supply line 29 into the chamber 26.

On the other end of the beam, that is, on the end opposite to which the above described welding apparatus is supported, there are provided blocks 30 having complemental recesses 31 receiving the end of the beam 1 and the blocks 30 are secured together around the beam 1 by bolts 32 which also serve to secure links 33 to the blocks. The depending ends of the links 33 receive a lug 34 on a transformer housing 35 a pin 36 being extended through the links 33 and the lug 34 to pivotally support the transformer housing 35 with respect to the links 33. The usual secondary coil of the transformer has its ends 37' projecting outwardly from the bottom of the housing 35 and connected to the electrodes 23 and 25 by cables 37. Generally designated by the numeral 38 is a conventional back pressure switch of the type usually employed in combination with spot welding apparatus to control the flow of electric current to the electrodes so that the momentary flow of current takes place at the time the parts to be welded are pressed together.

It is apparent from the foregoing that the links 5 may swivel with respect to the body 8 around the spindles 7 and that the body 8 is free to rotate with respect to the rod 9. The beam 1 may accordingly be moved around the axis of the rod 9 so as to permit the welding apparatus 22 to be moved laterally and the beam 1 may also be moved around the axis of the spindle 7. The whole apparatus may be moved along the conveyor rail 15 and the welding apparatus 22 may be moved vertically by unwinding or winding the cable 19 with respect to the pulley 18. The welding apparatus may be moved therefore, in any direction that might be necessary to accommodate the welding operation of different shaped work.

As a safety precaution collars 39 may be secured to the beam 1 to prevent sliding movement of the blocks 3 or 30 with respect thereto.

The apparatus may be adjusted so that different sized transformers or welding apparatus may be used on the same support. In the disclosure here presented the welding apparatus is considerably less in weight than the transformer contained in the housing 35 and the blocks 30 are positioned close to the blocks 3 as compared to the position of the member 16 which supports the welding apparatus. In the event that a heavier or lighter welding apparatus is used, the bolts 32 are loosened and the blocks 30 are moved so that the weight of the transformer is suspended from a point in the beam 1 where it counterbalances the weight of the welding apparatus.

Although a specific embodiment of the present invention has been illustrated and described it will be understood that various changes may be made in the details of construction without departing from the spirit of the invention as set forth in the appended claims and such changes are contemplated.

What we claim is:

1. Apparatus for supporting a welding device and a transformer in counterpoise relation, said apparatus comprising a beam, means connected to said beam between its ends and supporting said beam for rocking movement about a horizontal pivot, means adjacent one end of said beam and adapted to suspend a welding device, and means adjacent the other end of said beam movable in the direction of the length of the beam and adapted to be clamped in adjusted positions thereon, said last named means including a horizontal pivot adapted to support a transformer.

2. Apparatus for supporting a welding device and a transformer in counterpoise relation comprising, a bodily movable beam having a fulcrum intermediate its ends for vertical rocking movement of the beam, means carried by said beam at one side of said fulcrum and suspending a welding device from said beam, said suspending means being operable to raise and lower said welding device relative to said beam, and means carried by said beam on the other side of said fulcrum and suspending a transformer from said beam, one of said means being slidable along said beam to adjusted positions.

3. Apparatus for supporting a welding device and a transformer in counterpoise relation comprising a bodily movable beam having a fulcrum intermediate its ends and supported for universal rocking movement of said beam, means carried by said beam on one side of said fulcrum and suspending a welding device for movement relative to said beam, and means carried by said beam on the other side of said fulcrum for suspending a transformer from and relative to said beam about an axis substantially transverse to the longitudinal axis of said beam, said last-named means being slidable on and longitudinally of said beam to adjusted positions.

4. Apparatus for supporting a welding device and a transformer in counterpoise relation comprising, a bodily movable beam having a fulcrum intermediate its ends, means suspending said beam for universal movement thereof, means carried by said beam on one side of said fulcrum to suspend a welding device and connected to said beam to swivel relative thereto and also connected to the welding device for swivel movement relative thereto, and means carried by said beam on the other side of said fulcrum for suspending a transformer from said beam, said last-named means being pivotally connected to the transformer for swinging movement of the transformer about an axis transverse to the longitudinal axis of said beam.

ALBERT D. JARDINE.
HARRY V. BERONIUS.